Jan. 30, 1962 H. W. HOSBEIN 3,018,496
MOBILE RAMP
Filed Aug. 27, 1957 4 Sheets-Sheet 4
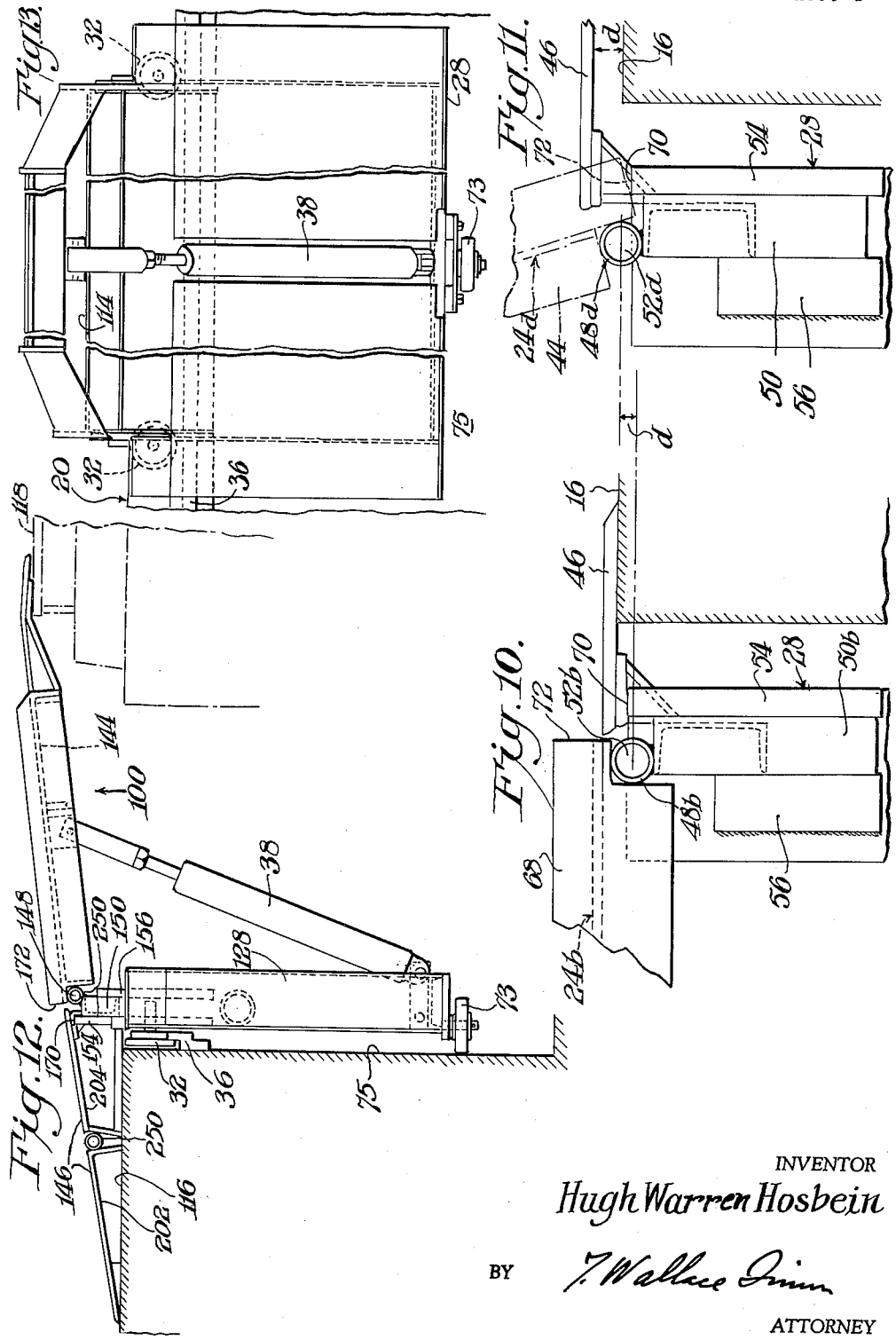
INVENTOR
Hugh Warren Hosbein
BY
ATTORNEY

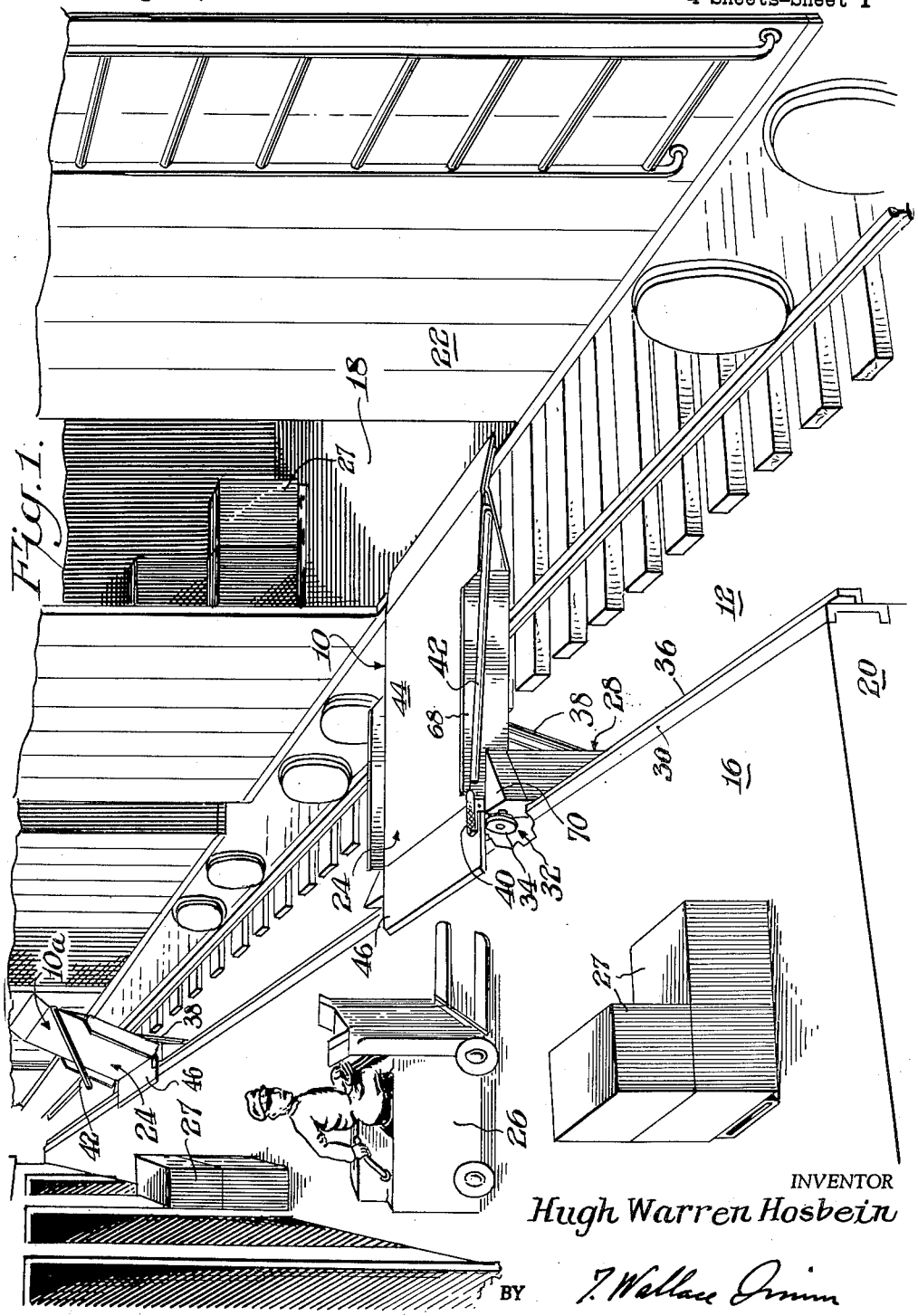

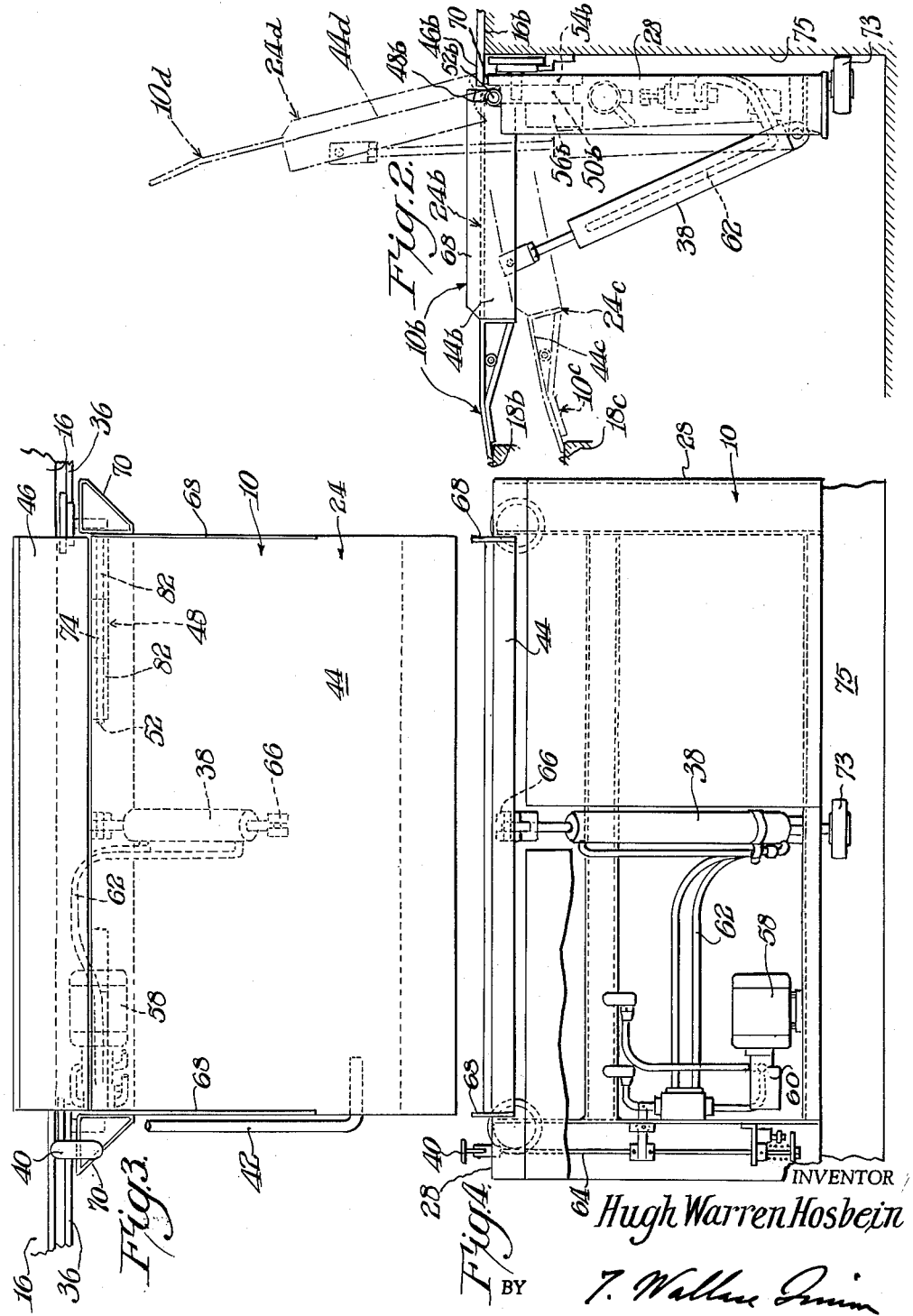

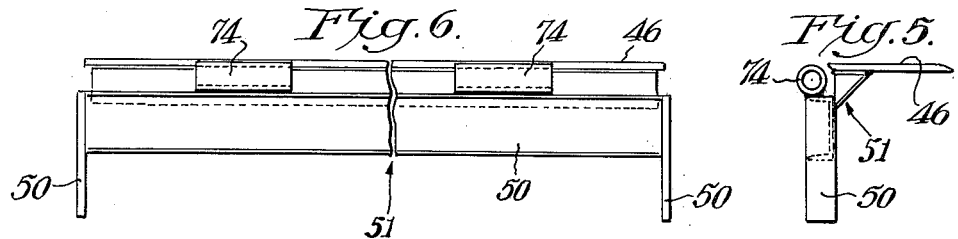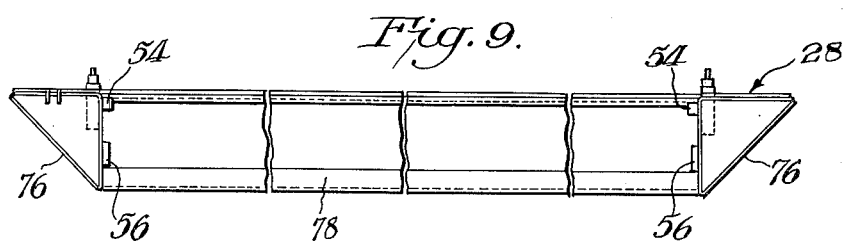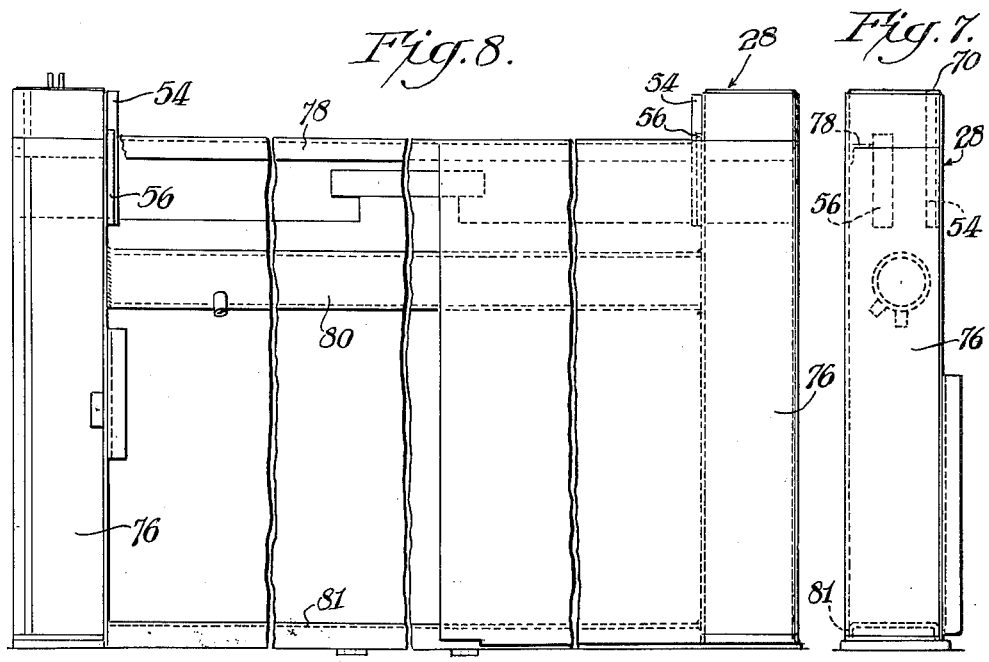

United States Patent Office 3,018,496
Patented Jan. 30, 1962

3,018,496
MOBILE RAMP
Hugh Warren Hosbein, Fort Wayne, Ind., assignor to Symington-Wayne Corporation, Salisbury, Md., a corporation of Maryland
Filed Aug. 27, 1957, Ser. No. 680,532
11 Claims. (Cl. 14—71)

This invention relates to a mobile ramp for bridging a space between two separated substantially parallel surfaces, and more particularly relates to a ramp of this type which is mounted at the edge of a loading dock to bridge the space between the dock and a vehicle parked alongside.

Heretofore, various types of movable and adjustable ramps have been proposed for use in conjunction with loading docks, but existing devices of this type have not incorporated as efficient a movable supporting structure as might be desired. One type of ramp or loading board is supported entirely from a movable structure attaching them to the dock. This type requires an unduly strong and expensive transporting structure for withstanding severe loads imposed during loading. Another existing type of loading dock utilizes an auxiliary ground support or brace positioned substantially midway between the loading dock and the adjacent vehicle. This complicates raising and lowering of the ramp, particularly by machine power, and clutters up the space adjacent the face of the loading dock which should be maintained clear for the passage of personnel and vehicles.

An object of this invention is to provide a self-contained mobile ramp for use in conjunction with a loading dock which does not require its transporting device to support the loads being carried across the ramp when it is serving as a bridge.

Another object is to provide a device of this type which lends itself to power operation and which is relatively simple and economical to manufacture.

In accordance with this invention, a frame is mounted by means of anti-friction transport means to move laterally adjacent the edge of one of the surfaces to be bridged. A platform for bridging the space between these surfaces includes approach and bridging parts with the approach part incorporating a vertically-movable connecting means and an approach plate which overhangs one of the surfaces. The approach part is connected to the frame through the vertically-movable connecting means and a guide means which laterally restrains the approach part and permits it to be moved from a position resting upon one of the surfaces to a position raised above it. This hinge means cooperates with the frame so that the platform may be moved out of contact with the edge of the surface upon which the frame is mounted when the outboard end of the platform is removed from contact with the other surface. An extensible support means reacts between the platform and the frame to apply the weight of the platform to the frame when the platform is moved out of contact with both of the surfaces to facilitate lateral transportation of the frame. The vertically-movable connecting means also permits the weight of the platform plus any load being sustained thereby to be removed from the frame and extensible support means when the platform is placed in substantially direct contact with both of the surfaces, the weight of the platform and any loads imposed thereon, under the circumstances being directly transmitted to the surfaces instead of to the frame under the lateral restraint of the frame transmitted through the vertically-movable connecting means. More particularly, the principal component of the weight of the approach part and a portion of the weight of the bridging part together with any load imposed upon them is transmitted to the surface under the approach plate with the remainder of the weights and load transmitted to the other surface. This permits the severe loads encountered during transportation of heavy loads across the ramp to be transmitted substantially directly to the bridge surfaces whereas the weight of the platform alone can be carried by the frame through the extensible support when the platform is moved away from contact with both of the bridge surfaces to facilitate lateral movement of the frame and attached platform. The anti-friction means, therefore, is only subjected to the weight of the platform and frame, and it may accordingly be made adequate in strength of relatively light construction. The vertically-movable connecting means of the approach part may be conveniently made in the form of a horizontal beam with the approach plate and hinge means connected to it, and the extensible support means may react against the bridging means to jointly raise it and the apporach part together with the hinge means when it is extended. In this arrangement a portion of the bridging part may be extended rearwardly to engage with a shoulder projecting from the frame when the bridging part is rotated upwardly to utilize leverage about the fulcrum provided by these engaged surfaces to raise the hinge and connected approach part.

Novel features and advantages of the present invention will become apparent to one skilled in the art from a reading of the following description in conjunction with the accompanying drawings wherein similar reference characters refer to similar parts and in which:

FIG. 1 is a perspective view of an embodiment of this invention installed in an operative position in conjunction with an illustrative loading dock arrangement;

FIG. 2 is a side view in elevation of the embodiment shown in FIG. 1 in various operative positions;

FIG. 3 is a plan view of the embodiment shown in FIG. 2 in an operative position;

FIG. 4 is a front view in elevation partially broken away of the embodiment shown in FIG. 2 in one operative position;

FIG. 5 is a side view in elevation of a portion of the embodiment shown in FIG. 2;

FIG. 6 is a front view in elevation of the portion shown in FIG. 5;

FIG. 7 is a side view in elevation of another portion of the embodiment shown in FIG. 2;

FIG. 8 is a front view in elevation of the portion shown in FIG. 7;

FIG. 9 is a plan view of the portion shown in FIG. 7;

FIG. 10 is a side view in elevation of the combined portions shown in FIGS. 5 and 7 in one condition of operation;

FIG. 11 is a side view in elevation of these same portions in the other condition of operation;

FIG. 12 is a side view in elevation of another embodiment of this invention; and FIG. 13 is a front view in elevation of the embodiment shown in FIG. 12.

In FIG. 1, a mobile ramp 10 which is one embodiment of this invention is shown in its operative position as it bridges the space 12 between two separated surfaces 16 and 18 which are respectively the surfaces of a loading dock 20 and the floor or deck of a vehicle 22, for example a railroad freight car. Mobile ramp 10 includes a platform 24 which is in substantially direct contact in the condition illustrated with surfaces 16 and 18 to impose its weight and the weight of loads transported across it, for example the weight of a forklift truck 26 and cargo 27 upon these surfaces.

Ramp 10 also includes a frame 28 which is mounted to move laterally adjacent the edge 30 of surface 16 by means of an anti-friction transport means 32. This anti-friction transport means 32, for example, includes roller means 34 and associated track means 36. A movable support means 38, for example a hydraulic piston and cylinder device, reacts between frame 28 and an outboard portion of platform 24 to permit the platform to be moved out of contact with the surfaces 16 and 18 and allow it to be laterally transported in the condition represented by mobile ramp 10a to a remote portion of the platform. A control means 40, a foot pedal for example, is connected to frame 28 to permit an operator to actuate raising and lowering movements of hydraulic cylinder 38. A pivoted arm 42 is attached to an outboard portion of the platform to permit a lateral force to be exerted upon the raised platform at a convenient height to move it laterally.

Platform 24 includes, for example, a main platform 44 and an approach plate 46. These elements are connected in a manner later described in detail with a hinge means also later described in detail which is movably coupled to the frame in a manner which permits the load of the platform to be imposed on the frame only when the platform is moved clear, for example raised away from, the surface 16 of the loading dock 20. This facilitates lateral movement of the platform by means of the roller and track and frees the roller and track from the necessity of supporting the severe loads of trucks 26 and cargo 27 when the platform bridges surfaces 16 and 18. Means for providing this relative motion between the platform, frame, and loading dock is described in detail in the following.

In FIG. 2, ramp 10 is shown in various operative conditions. In the position designated as 10b, a platform 24b imposes its weight and the weight of loads transported across it substantially directly upon surfaces 16b and 18b. This is accomplished, for example, by releasing the pressure in hydraulic piston and cylinder 38 to permit main platform 44b and approach plate 46b to respectively rest directly upon surfaces 18b and 16b. Hinge means 48b, therefore, is free floating and serves only to connect portions 44b and 46b of platform 24b. This free floating condition of hinge means 48b is accomplished, for example, by attachment of one half of hinge means 48b directly to a horizontal beam 50b which is rigidly connected, by welding for example, to approach plate 46b in a manner later described in detail. Another tubular portion of hinge means 48b is attached to main platform 44b, and the two tubular portions are connected by a hinge shaft 52b. For enlarged details of this condition, see FIG. 10. Beam 50b is free to move upward and downward, for example, within substantially vertical slots provided between the adjacent surfaces of pairs of vertical guide bars 54 and 56 attached to the sides of frame 28.

The main platform position designated as 44c is substantially similar to that indicated in 44b with the exception that the outboard end of the platform rests upon a surface 18c which is quite a distance lower than 18b. This position illustrates the fact that the platform can be easily adjusted to rest upon surfaces a considerable distance below surface 16b of the loading dock as well as surfaces substantially parallel with it.

However, in the position of the main platform designated as 24d, the platform has been moved out of contact with surfaces 16 and 18 which accomplishes a drastic change in the relative positions of the platform, frame and loading dock. For enlarged details of this condition, see FIG. 11. A raising of the platform 24d is accomplished by applying pressure to the hydraulic cylinder 38 by means, for example, of an electric motor 58, a hydraulic pump 60, hydraulic piping 62, control linkage 64 and foot pedal control 40 which actuates a switch for the electric motor through control linkage 64. These elements are not described in detail because they can be provided by any given means for applying hydraulic pressure to piston and cylinder 38. Piston and cylinder 38 are connected, for example, to a lower portion of the platform 24 by means of a rotatable coupling 66 to constitute the piston and cylinder 38 as a supporting and lifting brace for platform 24.

Platform 24 includes, for example, a pair of substantially vertical side edges 68 upon bridging part 44. An upper surface 70 of frame 28, for example the top of bar 54, and the edge 72 of platform side 68, which lies adjacent frame surface 70 when platform 24d is raised by cylinder 38, are constructed and arranged to contact each other in a manner which lifts the platform and attached hinge relative to the frame. This raises the platform and approach plate from the condition illustrated in FIG. 10 to the position illustrated in FIG. 11. The approach plate 46 of platform 24 and the main platform 44 are thereby moved away from their respective surfaces 16 and 18 to permit the ramp to be transported laterally to another portion of the loading dock in the condition designated as 10a in FIG. 1 which corresponds to the condition shown in phantom as 10d in FIG. 2. For example, in FIG. 11, approach plate 46 is lifted a distance "d" above surface 16. Hinge 48d is also raised this same distance "d" above hinge 48b as indicated in a comparison of their positions in FIGS. 11 and 10. In this raised condition, the weight of the platform is imposed upon the frame 28 by means of the support provided by hydraulic cylinder and piston 38 which reacts upwardly against main or bridging platform part 44. The lifting force of movable or extensible support means 38 is transmitted to the hinge, for example, through the main platform section 44 in the illustrated embodiment. The contacting surfaces 72 of main platform edge 68 and 70 of the frame when brought together effect raising of the hinge and attached approach part 51 shown in FIG. 5 away from the support provided by the surface 16 to impose their weight upon the frame together with that of bridging part 44 to permit lateral transportation of these parts with the frame.

Lateral movement of the frame is further facilitated by another roller means 73 which is attached to a lower portion of frame 28 on a substantially vertically disposed axis to rotatably bear against vertical face 75 of loading dock 20.

In FIGS. 5 and 6, the unitary assembly of approach plate 46 and beam 50 with tubular half 74 of hinge means 48 to form approach part 51 is shown to clearly illustrate its mode of construction. Half 74 of hinge means 48 and approach plate 46 are accordingly conveniently connected to approach part 51 through their attachment to beam 50.

In FIGS. 7, 8 and 9, portions of frame 28 which interlock with the assembly shown in FIGS. 5 and 6 are illustrated. FIGS. 7, 8 and 9 particularly show the manner in which vertical bars 54 and 56 are connected to the vertical end beams 76, triangular section beams for example, of frame 28 and the manner in which these triangular end beams 76 are bridged by lateral braces 78, 80 and 81. The other tubular half 82 of hinge 48 is attached to main platform section 44 and these tubular hinge halves 82 and 74 are interconnected by hinge shafts 52.

In FIGS. 12 and 13, a modification 100 of the mobile ramp 10 is illustrated which includes an approach plate 146 having a pair of hinged sections 202 and 204 joined by a rotatable joint 250 constructed, for example, in a similar manner to hinge 48. Approach plate 146 is relatively longer than approach plate 46, but its hinged construction allows the outer end 202 to be folded over the intermediate section 204 when the approach plate is raised with hinge 148. This permits the ramp to be used to connect a surface 116 with a surface 118 disposed, for example, a considerable height above it. All other portions of the embodiment shown in FIGS. 12 and 13 are substantially similar to those discussed in conjunction with mobile ramp 10. However, bars 154 and 156 are raised a considerable distance above the upper surface of frame 128 to engage the beam 150 in its elevated condition. In fact, bar 154 is extended a considerable distance above bar 156 to provide a surface 170 sufficiently high to engage adjacent surface 172 of main platform 144 to lift hinge 148.

What is claimed is:

1. A mobile ramp for bridging a space between first and second surfaces comprising a supporting frame, transport means mounting said frame to move laterally adjacent the edge of said first surface, a platform for bridging said surfaces including adjacent approach and bridging parts which respectively contact said first and said second surfaces in bridging them, said approach part including an approach plate over-hanging said first surface and a vertically-movable connecting means, guide means coupling said vertically-movable connecting means to said frame whereby said approach part is laterally restrained and made movable from a position resting upon said first surface to one raised above said first surface, hinge means connecting the adjacent ends of said bridging part and said approach part whereby the remote end of said bridging part is movable toward and away from said second surface, extensible support means reacting between said frame and said platform for lifting said approach and said bridging parts away from contact with said surfaces and supporting them upon said frame whereby the lateral movement of said ramp is facilitated, and said extensible support means being sufficiently retractable to drop said approach and bridging parts into respective contact with said first and said second surfaces whereby the principal component of the weight of said approach part and a portion of the weight of said bridging part together with any load imposed upon them is transmitted to said first surface with the remainder of said weights and said load transmitted to said second surface under the lateral restraint of said frame exerted upon said platform through said vertically-movable connecting means.

2. A mobile ramp as set forth in claim 1 wherein said vertically-movable connecting means and said guide means comprise cooperating vertically-directed projection and slot means which connect said approach part to said frame.

3. A mobile ramp as set forth in claim 2 wherein said vertically-movable connecting means comprises a horizontal beam, said hinge means being connected to said beam, and said approach plate also being connected to said beam.

4. A mobile ramp as set forth in claim 3 wherein said guide means comprises vertically-directed shaft means upon opposing surfaces of the sides of said frame, and the ends of said beam comprising said projection means which are inserted to slide up and down within said slot means.

5. A mobile ramp as set forth in claim 1 wherein said extensible support means reacts between said frame and said bridging part.

6. A mobile ramp as set forth in claim 5 wherein a rearwardly extending portion of said bridging part extends past the axis of rotation of said hinge means, a shoulder projecting from an upper surface of said frame, and said extending portion being disposed for engagement by said shoulder when said bridging part of said platform is rotated upwardly by said extensible support means to raise said hinge means and said connected approach part upwardly from said first surface.

7. A mobile ramp as set forth in claim 6 wherein said extending portion of said main bridging part of said platform comprises side edges of said platform.

8. A mobile ramp as set forth in claim 1 wherein said extensible support means includes a hydraulic cylinder and piston means.

9. A mobile ramp as set forth in claim 1 wherein said transport means is comprised of track and roller means connecting said frame to said edge of said surface.

10. A mobile ramp as set forth in claim 9 wherein said track and roller means includes a track attached to said edge of said surface and extending substantially parallel to said surface, a set of roller means connected to said frame and having axes disposed substantially parallel to said surface for mounting said frame upon said track, said surface including a substantially vertical face, and other roller means connected to a lower portion of said frame and having an axis disposed substantially parallel to said face of said surface to permit said other roller means to rotatably bear against said face when said frame is laterally transported.

11. A mobile ramp as set forth in claim 1 wherein said approach plate includes two sections joined together disposed parallel to said hinge means, and said two sections are joined by another hinge means to permit the section remote from said first mentioned hinge means to be folded over the section adjacent said first mentioned hinge means when said approach part is lifted to facilitate lateral movement of said frame.

References Cited in the file of this patent
UNITED STATES PATENTS

| | | |
|---|---|---|
| 1,181,792 | Oenning | May 2, 1916 |
| 1,195,085 | Raber | Aug. 15, 1916 |
| 2,211,581 | Ross | Aug. 13, 1940 |
| 2,689,965 | Fenton | Sept. 28, 1954 |
| 2,709,410 | Fenton | May 31, 1955 |
| 2,714,735 | Watson | Aug. 9, 1955 |